Figure 1:
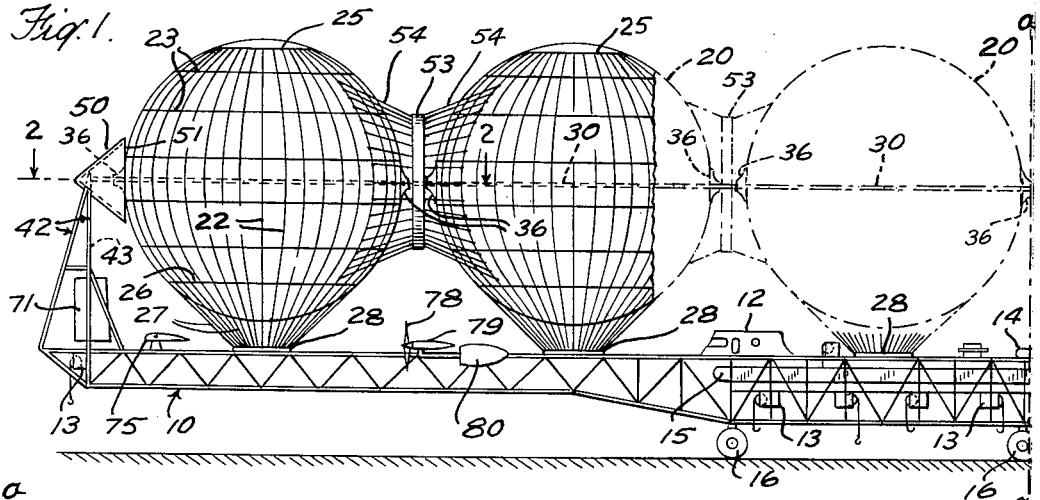

Feb. 1, 1966 R. T. CELLA 3,232,562
AIR BORNE LIFTING VEHICLE
Filed April 8, 1964 2 Sheets-Sheet 1

INVENTOR
RICHARD T. CELLA
BY
ATTORNEY

Feb. 1, 1966  R. T. CELLA  3,232,562
AIR BORNE LIFTING VEHICLE
Filed April 8, 1964  2 Sheets-Sheet 2

INVENTOR
RICHARD T. CELLA
BY
ATTORNEY

United States Patent Office
3,232,562
Patented Feb. 1, 1966

3,232,562
AIR BORNE LIFTING VEHICLE
Richard T. Cella, 35 Park Ave., New York, N.Y.
Filed Apr. 8, 1964, Ser. No. 358,301
5 Claims. (Cl. 244—30)

This invention relates to airborne vehicles and more particularly to a vehicle which is adapted to lift and transport a heavy pay load.

An object is to provide a vehicle of the above type which is adapted to lift and transport articles of a size and weight such that they are unsuitable for transporting by truck or railway.

Another object is to provide a vehicle of the above type which can be accurately controlled and maneuvered and which is of relatively simple construction.

Another object is to provide such a vehicle utilizing a plurality of lighter-than-air pressurized bags for a substantial portion of its lift wherein the bags are mounted for independent lateral movement and without a rigid framework or truss.

Another object is to provide a construction for a vehicle of the above type wherein the weight of the envelope and of the associated parts is reduced to a minimum.

Another object is to provide a vehicle of the above type utilizing a plurality of lighter-than-air pressurized bags mounted in succession wherein turbulence at the leading and trailing sides of each bag is reduced to a minimum.

Another object is to provide such an airborne vehicle wherein a predetermined portion of the lift is produced by mechanical means.

Various other objects and advantages will be apparent as the nature of the invention is more fully disclosed.

In accordance with the present invention, the vehicle comprises a rigid keel or boom which extends the entire length of the vehicle and supports the operating mechanism such as the pilot's cab, hoist, winches, power plants, ballast and fuel tanks and control elements. A succession of lighter-than-air bags is tethered to this keel in a manner such that each bag is free to be displaced laterally through a limited distance in response to variations in air currents. The bags, however, are secured together in a longitudinal direction by a cord which extends between fore and aft pylons through all of the bags, each bag being independently fixed to the cord. The cord also transmits the pull from the keel to the various bags so that each bag is pulled independently.

Circular flow fences are suspended between successive bags in a position to control air turbulence in the intervening spaces. Such turbulence, if not controlled, would tend to produce flutter of the bags and thus interfere with the manageability of the vehicle.

The proportions are such that the buoyancy of the bags produces a predetermined major portion of the lift which is required. The remainder of the lift, when the vehicle is in static state, is produced by tiltable propellers which are arranged to produce a downward, forward or upward thrust when required for maneuvering the vehicle relative to the object to be hoisted. When in airborne position, the propellers are turned to produce the necessary forward thrust and the lift is enhanced by controllable wings or air foils.

The nature of the invention will be better understood by referring to the following description taken in connection with the accompanying drawings in which a specific embodiment has been set forth for purposes of illustration.

Figure 1A:
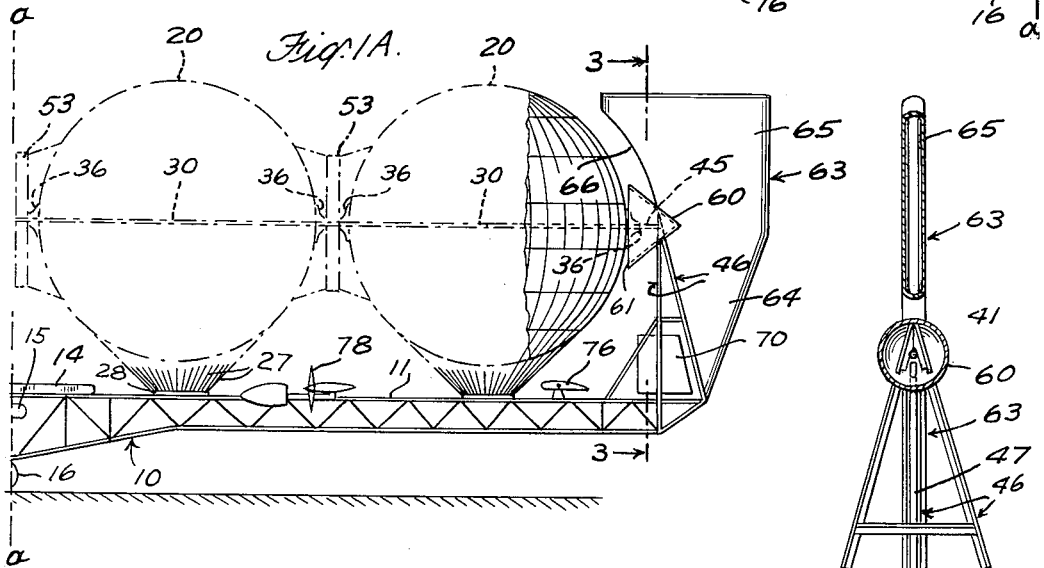

In the drawings:

FIGS. 1 and 1A, when joined along the line a—a are a side elevation of an airborne vehicle embodying the invention.

Figure 3:
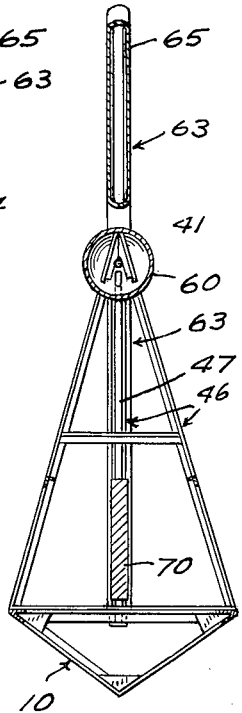
Figure 2:
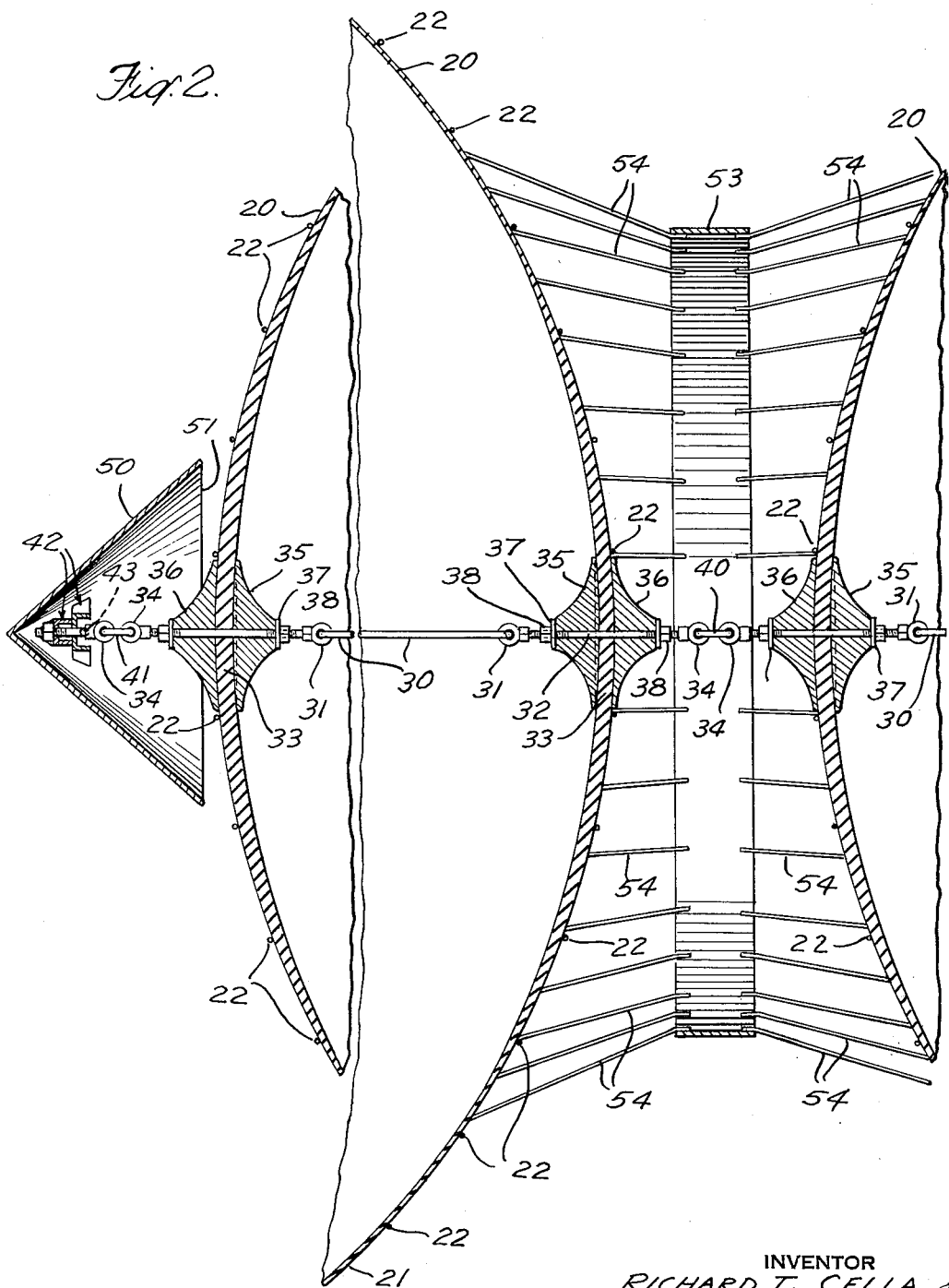

FIG. 2 is a section taken on the line 2—2 of FIG. 1 on a much larger scale showing the means for sealing the connecting line to the envelopes of the bags and FIG. 3 is a vertical transverse section taken on the line 3—3 of FIG. 1A but on a larger scale.

Referring to the drawings more in detail, the invention is shown as embodied in a vehicle comprising a keel or boom 10 which is shown as in the form of a framework having an upper flat deck portion 11 supporting a control cabin 12, a plurality of hoisting winches 13, a fuel tank 14, a ballast tank 15 and a plurality of landing wheels 16.

A plurality of lighter-than-air bags 20 are tethered to the keel 10. Each bag 20 comprises an envelope 21 and a net composed of vertical lines 22 and horizontal lines 23 joined together at points of crossover. The vertical lines 22 extend from a ring 25 at the top of the bag to a ring 26 at the bottom of the bag by means of which they are secured in a predetermined relative position. Suspending cables 27 extend from the vertical lines 22 to a collecting ring 28 which is mounted on the deck 11 of the keel 10.

A cable 30 extends diametrically through each bag in a longitudinal direction with each end secured to an eye 31 on a bolt 32 which extends through a thickened portion 33 of the envelope 21 and is formed with an outer eye 34. Tapered inner and outer plates 35 and 36 carried by the bolt 32 clamp and seal the thickened portion 33 of the envelope 21 and are secured by washers 37 and nuts 38. The plates 35 and 36 are bonded by a suitable bonding agent to the adjacent surfaces of the envelope and are adapted to transmit the longitudinal pull to the thickened area 33 which is of substantially greater diameter than that of the plates and is adapted to transmit the pull to the thinner portions of the envelope 21 over a sufficient area to prevent excessive strains from being built up.

Successive bags 20 are secured together by lines 40 which are coupled to the external eyes 34 at the leading and trailing sides respectively of the adjacent bags. The leading side of the leading bag 20 is secured by a line 41 to a rigid pylon 42 which extends upwards from the forward end of the keel 10 and includes a vertical post 43. The eye 34 at the trailing side of the trailing bag is connected by a line 45 to a similar rigid pylon 46 which is mounted at the rear end of the keel 10 and includes a vertical post 47. The arrangement is such that the lines 30, 40, 41 and 45 constitute in effect a cable which connects all of the bags 20 together and transfers the pull from the forward pylon independently to each of the bags so that each bag is maintained in its predetermined relative longitudinal position and does not introduce any strain or pull on the adjacent bags. At the same time, the bags are free to shift laterally independently of each other so as to absorb lateral thrust due to variations in wind pressure along the vehicle.

In order to minimize turbulence at the leading side of the leading bag, a rigid nose cone 50 is mounted on the forward pylon 42. The trailing edge 51 of the nose cone 50 is spaced from the surface of the forward bag 20 and the maximum diameter of the nose cone is somewhat less than the diameter of the bag, for example, of the order of one-half of the diameter of the bag. This is usually sufficient to produce a smooth flow of air from the surface of the nose cone over the corresponding surface of the bag.

A flow fence in the form of a rigid ring 53 is suspended by lines 54 between each pair of successive bags 20, the lines 54 being attached to the lines 22 of the adjacent nets. The rings 53 are of lesser diameter than the bags, being, for example, of the order of one-fourth of the bag diameter and are relatively narrow in the longitudinal direction. The purpose of the rings is to modify turbulence in the air flow between the trailing side of one bag and the leading side of the next bag so that the air is caused to flow along the sides of the successive bags in a relatively smooth manner. In this way, turbulence which would tend to cause flutter of the bags is reduced to a minimum and the bags are maintained in spherical form. Since the longitudinal diameter of each bag is fixed by the internal lines 30 and the vertical and horizontal circumferences of the bag are fixed by the corresponding lines of the suspending nets, the distortion of the bags due to wind currents and turbulence is reduced to a minimum.

The turbulence at the rear side of the trailing bag is reduced by a tail cone 60 which is mounted on the rear pylon 46. This tail cone 60 is similar to the nose cone 50 and has a leading edge 61 spaced from the surface of the trailing bag 20. A tail fin 63 is mounted on the rear pylon 46 and includes a tapered portion 64 extending below the tail cone 60 approximately to the keel 10 and a portion 65 extending above the tail cone 60 to substantially the height of the bag 20 with a forward edge 66 of arcuate shape to conform in general to the shape of the adjacent portion of the bag 20. The tail fin 63 is supported by the usual guy wires, not shown. A tail rudder 70 is mounted on the vertical post 47 of the rear pylon 46 and a bow rudder 71 is mounted on the vertical post 43 of the forward pylon 42. These rudders are controlled by suitable means, not shown, from the cabin 12.

A pair of forward wings 75 are mounted at the forward end of the keel 10 and a pair of rear wings 76 are mounted at the rearward end of the keel 10. These wings 75 and 76 are preferably adjustable so that their angle of attack can be altered by the operator by suitable means, not shown. A plurality of propellers 78 mounted for tilting at various angles by a tilting mechanism 79 and driven by motors 80 are mounted on opposite sides of the keel 10. The propellers are tiltable in all directions for maneuverability.

In the operation of this vehicle for lifting a heavy object, the various lines and the bags are preferably made of a light material which is resistant to ultraviolet rays such as mylar, a synthetic filament or film composed of the condensation product of ethylene glycol and terephthalic acid. The mylar film of the bag envelope is substantially non-stretchable and the bags are pressurized at least to the level of the dynamic pressure at the designed speed so that they tend to maintain their shape under the usual operating conditions. When a bag of this type is filled with hydrogen at a relatively low pressure, the diffusion rate of the hydrogen through the film is sufficiently low so that loss of hydrogen is not appreciable nor does the hydrogen diffuse through the film at a sufficient rate to produce any combustible mixture.

In the operation of this vehicle for lifting a heavy object, the vehicle is weighted by means of the ballast in the ballast tank 15 to an extent such that the weight of the vehicle plus the weight of the object to be lifted exceeds the buoyancy of the vehicle by a few percent. In this way, the maneuverability of the vehicle is improved. When the object is to be raised, the propellers are shifted to exert a upward thrust which is sufficient to overcome the balance of buoyancy and cause the vehicle in load to rise. When the vehicle has risen to the desired altitude, the propellers are turned to provide the desired forward thrust. As the vehicle thus moves forward, the lift provided by the wings supplements the buoyancy of the vehicle to maintain the same at the desired altitude. For landing the vehicle, the forward thrust is eliminated and the excess of weight over the buoyancy of the vehicle causes the vehicle to descend without the valving of gas. The propellers are now turned to exert a downward thrust and are manipulated so as to control the descent of the vehicle. During the forward movement, the bow and rear rudders and the tail fin provide the necessary stability for controlling the flight. In a device of this type relatively slow speeds are adequate as the load is normally to be transported only a short distance and the question of wind resistance and turbulence is much less of a problem at low speeds. Also the power requirements are correspondingly less.

What is claimed is:

1. An aerial lifting vehicle comprising a rigid keel, a plurality of lighter-than-air pressurized balloons disposed in a spaced series along and individually anchored to said keel, rigid support members carried at the bow and stern of said keel and extending upwardly therefrom at least to the center lines of said balloons, a tension cable anchored to said support members and extending through all of said balloons and having means securing said balloons in predetermined spaced relationship, and propelling means carried by said keel, said balloons comprising bags having thickened portions disposed at diametrically opposite fore and aft areas, a metal member having internal and external coupling members extending through said thickened portions and tapered metal discs carried by said metal members disposed to clamp and seal said bag thereto, said tension cable including cables attached to said internal coupling members and extending through the diameter of said balloons and connecting cables connected to the external coupling members of adjacent balloons.

2. An aerial lifting vehicle comprising a rigid keel, a plurality of lighter-than-air pressurized balloons disposed in a spaced series along and individually anchored to said keel, rigid support members carried at the bow and stern of said keel and extending upwardly therefrom at least to the center lines of said balloons, a tension cable anchored to said support members and extending through all of said balloons and having means securing said balloons in predetermined spaced relationship, rigid nose and tail cones having a diameter less than that of said balloons carried by said support members and spaced from the leading and trailing balloons to minimize turbulence in the air flow over said balloons, and propelling means carried by said keel.

3. An aerial lifting vehicle comprising a rigid keel, a plurality of lighter-than-air pressurized balloons disposed in a spaced series along and individually ancored to said keel, rigid support members carried at the bow and stern of said keel and extending upwardly therefrom at least to the center lines of said balloons, a tension cable anchored to said support members and extending through all of said balloons and having means securing said balloons in predetermined spaced relationship, rigid, annular members disposed between said balloons to form flow fences to control the turbulence in the air flow over said balloons and propelling means carried by said keel, said annular members having a diameter less than the vertical diameter of said balloons and having forward and rearward edges spaced from the respective balloons to provide clearance for air flow.

4. A vehicle as set forth in claim 3 in which rope nets are disposed around said balloons and means is provided to suspend said annular members from the rope nets of adjacent balloons.

5. A vehicle as set forth in claim 3 having rigid nose and tail cones have a diameter less than that of said balloons mounted on said rigid support members and spaced from the leading and trailing surfaces of the balloons respectively to provide for air flow without turbulence over said balloons.

References Cited by the Examiner

UNITED STATES PATENTS

| | | | |
|---|---|---|---|
| 328,218 | 10/1885 | Helmer | 244—30 |
| 1,025,797 | 5/1912 | Fischer | 244—33 |
| 1,228,159 | 5/1917 | Kaplan | 244—24 |
| 1,726,062 | 8/1929 | Gilman | 244—25 X |
| 1,806,135 | 5/1931 | Ward | 244—3 |

FOREIGN PATENTS

| | | |
|---|---|---|
| 2,057 | 1884 | Great Britain. |
| 237,480 | 9/1910 | Germany. |

MILTON BUCHLER, *Primary Examiner.*

FERGUS S. MIDDLETON, *Examiner.*